United States Patent Office 2,709,496
Patented May 31, 1955

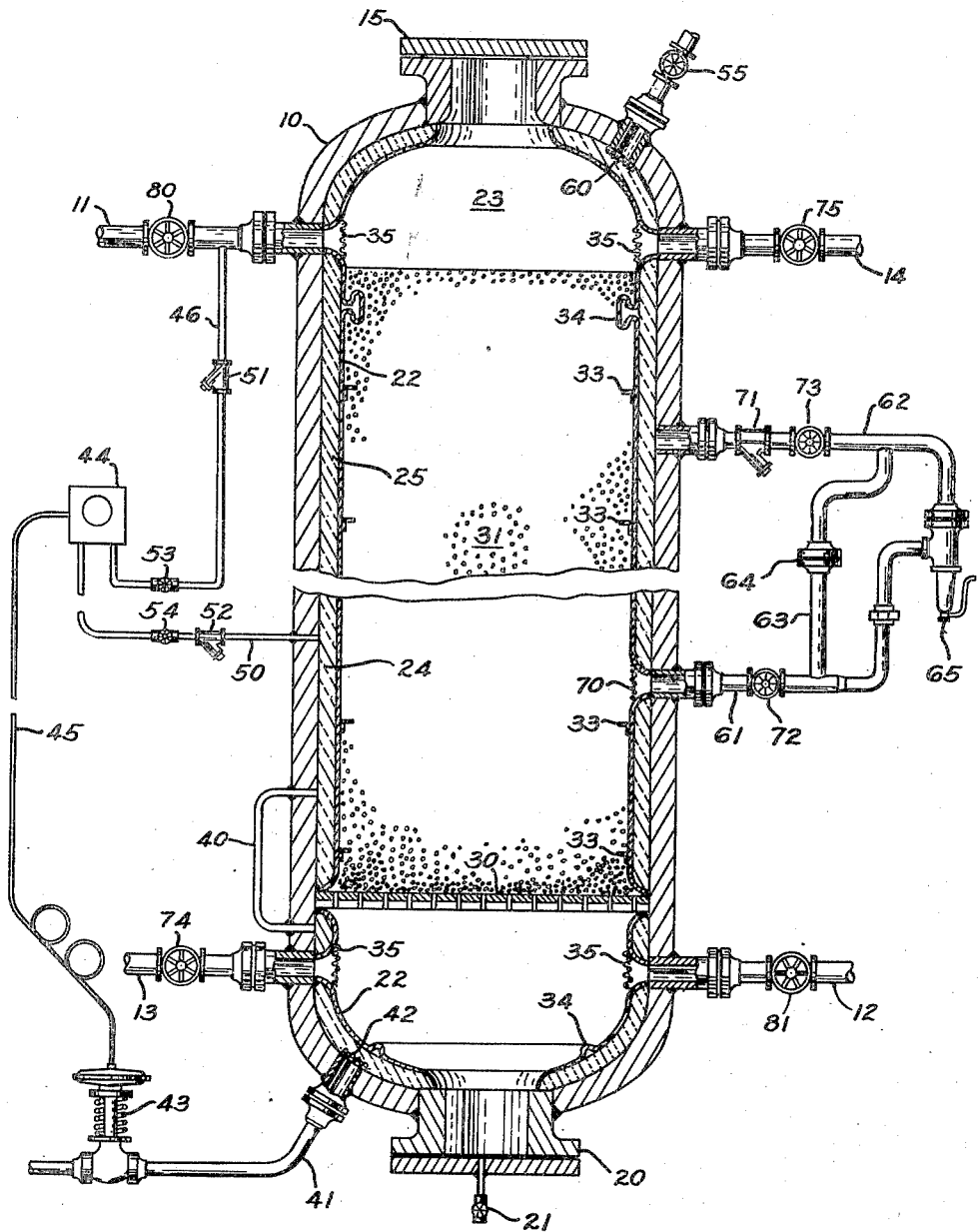

2,709,496

GAS DRIER

Charles Ovid Baker, Garland, Tex., assignor, by mesne assignments, to Socony Mobil Oil Company, Inc., a corporation of New York Application August 30, 1951, Serial No. 244,294

10 Claims. (Cl. 183—4.1)

This invention relates to gas drying and relates more particularly to an internally insulated gas drier.

It is often highly desirable or necessary to remove water vapor from a gas and this removal of water vapor, or drying, may be accomplished by passing the gas through a chamber packed with a solid desiccant. During the drying cycle or passage through the chamber of the gas to be processed, the desiccant adsorbs the water vapor from the gas. After the desiccant has adsorbed sufficient water vapor to no longer efficiently dry the gas, called the process gas, the flow of process gas through the chamber is stopped and the desiccant is regenerated by passing hot gas, called the regeneration gas, through the chamber whereby at least the greater portion of the water vapor adsorbed by the desiccant is removed therefrom and the desiccant is prepared for another drying cycle. The drying chambers are relatively massive and have a high heat capacity and a considerable proportion of the heat required for a regeneration cycle represents waste in heating of the chamber. It has been proposed to reduce this heat loss by providing gas driers with an internal layer of heat insulating material, the layer of heat insulating material being supported within the chamber and separated from the desiccant by a relatively thin metal liner whereby the heat lost will be essentially only that consumed by heating of the liner. These driers, however, are unsatisfactory since the process gas tends to contact the insulation whereby the insulation becomes wet, particularly where the process gas is at high pressures, and, further, the metal liner tends to collapse. Wet insulation does not provide proper heat insulating properties, it deteriorates rapidly, and it is difficult to dry during the regeneration cycle. In addition, the water from the wet insulation tends to go back into the process gas during the drying cycle.

It is an object of this invention to provide an internally insulated gas drier. It is another object of this invention to prevent wetting of insulation in a gas drier. It is another object of this invention to prevent collapse of metal liners in internally insulated gas driers. Further objects of the invention will become apparent from the following description thereof.

In accordance with my invention, a gas drier is provided which comprises an outer casing, a liner within the casing separated from the walls thereof whereby an annulus is formed between the inner walls of the casing and the liner, the liner also providing a chamber to contain a desiccant, heating insulating material within the annulus, means for imposing a gas pressure within the annulus, and means for controlling the gas pressure within the annulus at a predetermined value with respect to the gas pressure within the chamber.

The invention will be more readily understood by a reading of the following specification taken in conjunction with the accompanying drawing which is a plan view, partly in section, of a preferred embodiment of the invention.

Referring now to the drawing, casing 10 of the drier is provided with inlet line 11 and outlet line 12 for the process gas and inlet line 13 and outlet line 14 for the regeneration or drying gas. Manholes 15 and 20 are provided to give ready access to the interior of the drier. Manhole 20 contains drain valve 21 to allow any condensate which may collect in the bottom of the drier to be drained off.

Casing 10 which is of relatively heavy construction to withstand the pressure at which the drier may be operated, is provided within the interior thereof with liner 22 which is of relatively light construction and forms chamber 23. The liner surrounds the entire inner surface of the casing with the exception of the areas constituting the ports to which inlet and outlet lines 11, 12, 13, and 14 and other lines to be described hereinafter lead, and forms annulus 24 within the casing. Heat insulating material 25, which may be any type of heat insulating material, such as rock wool, fiber glass, etc., capable of withstanding desiccant regeneration temperatures, for example, temperatures of 325° F. and higher, is contained within the annulus 24. Packed within the chamber 23 and supported by grating 30 is a body of solid desiccant 31, which may be any solid water-adsorbent material capable of drying gases, such as silica gel. The grating 30 may be supported within the chamber 23 in any suitable manner. As shown, the grating is supported within the chamber by attaching to the inner wall of the casing 10 and the grating may be attached to the casing by suitable means such as by bolts, rivets, or welds. Since the grating extends entirely around the inner wall of the casing 10, the grating separates the annulus into an upper annulus and a lower annulus.

Positioned within and affixed to liner 22 are a plurality of ring stiffeners 33 to enable the liner to resist collapse in the event an excessive gas pressure differential exists between the annulus and the chamber. Liner 22 is shaped to provide a plurality of expansion rings 34 to compensate for expansion and contraction taking place in the liner due to changes of temperature within the drier. Liner 22 is further provided at the inlet and outlet ports thereof with screens 35 to prevent desiccant from passing from the interior of the drier into these inlet and outlet lines. Line 40 connects the upper and lower annulus to equalize the gas pressures therein.

The process gas as well as available regeneration gas may be at relatively high pressures, such as pressures of the order of 200 pounds per square inch or higher, for example, above 2,000 pounds per square inch. In any case, it may not be desirable to place any limitation upon the pressure of the gases that may be dried or the regeneration gases that may be employed. Accordingly, the pressure of the gas within the chamber 23 during either the drying cycle or the regeneration cycle may be at relatively high pressures and these pressures will tend to force the liner 22 outwardly toward the inner walls of the chamber 23. As a result thereof, the insulation will become compressed between the liner and the wall of the chamber with consequent reduction in the insulating qualities of the insulation and, further, the liner tends to rupture or leak with consequent flow of process gas into the annulus causing wetting of the insulation. In accordance with one of the features of the invention, these effects are prevented by maintaining a gas pressure within the annulus and controlling this gas pressure at a predetermined value with respect to the gas pressure within the chamber whereby the pressure differential between the annulus and the chamber will be insufficient to cause injury to the liner or compression of the insulation.

The casing 10 is provided with a line 41 leading to annulus 24 and the gas pressure within the annulus is provided by passage of a gas through this line. To prevent insulation from the annulus entering the line 41, the line 41 is provided with screen 42. For imposing the gas pressure within the annulus, any suitable gas may be employed. However, this gas must be sufficiently dry to prevent wetting of the insulation to the extent that the insulating qualities are affected sufficiently to cause uneconomical loss of heat to the casing or to otherwise deleteriously affect the insulation. Further, this gas must be at a sufficiently high pressure to maintain the pressure within the annulus at a sufficiently high value with respect to the pressure within the chamber. Additionally, the gas should be a gas that will not form an explosive mixture with or deleteriously contaminate either the process gas or the regeneration gas upon inadvertent or accidental admixture. Conveniently, dry process gas may be employed although compression of this gas to a higher pressure than its pressure when leaving the drier may be required, as will become apparent hereafter.

The pressure of the gas within the annulus need only be such that the pressure differential between the annulus and the chamber is not sufficiently great to compress the insulation to an extent that its insulating qualities are affected sufficiently to cause uneconomical loss of heat to the casing or that the liner is ruptured or leaks appear therein. Consequently, the pressure within the annulus will depend upon the pressure within the chamber and upon the pressure differential between the annulus and the chamber that may be tolerated considering the allowable extent of the compression of the insulation and the mechanical strength of the liner. The pressure within the annulus may be less than, equal to, or greater than the pressure within the chamber. It is preferred, however, that the gas pressure in the annulus be greater than the gas pressure in the chamber in order that the gas for imposing the pressure within the annulus will flow from the annulus to the chamber, in the event that any leaks appear in the liner, rather than having the gas within the chamber, particularly the process gas, flowing from the chamber to the annulus. Further, it is preferred that this gas pressure be only slightly higher than the gas pressure within the chamber, for example, about one pound per square inch, in order to minimize strains on the liner caused by the pressure differential.

To maintain the desired pressure differential between the annulus and the chamber, line 41 is provided with motor valve 43 responsive to pressure controller 44 and connected thereto by line 45. The pressure controller is subjected to the pressure within the chamber 23 by means of line 46 leading between the controller and line 11 and is subjected to the pressure within the annulus 24 through line 50. The motor valve 43 and the pressure controller are of conventional construction and the pressure controller operates in response to the pressure in the chamber and the annulus to cause the motor valve 43 to open or close to adjust the pressure in the annulus to the predetermined differential between the pressure in the chamber. Lines 46 and 50 are provided with traps 51 and 52, respectively, to prevent desiccant or insulating material, respectively, from entering the lines and interfering with operation of the pressure controller and are also provided with valves 53 and 54, respectively, to enable closing of the line for adjustment of the controller or otherwise. In order that the gas pressure within the annulus may be maintained at its desired value with respect to the pressure in the chamber when the pressure within the chamber becomes lower than the pressure within the annulus, casing 10 is provided with bleed valve 55 which permits a constant slow flow of gas from the annulus. Screen 60 is provided to prevent insulation from entering and interfering with the operation of bleed valve 55.

To prevent rupture of liner 22 or compression of insulation 25 due to excessively high pressure differential between the annulus and the chamber as a result of accidental non-functioning or misfunctioning of controller 44, motor valve 43, and bleed valve 55, line 61 leading to the chamber and line 62 leading to the annulus are provided and line 63 containing rupture disc 64 is connected between the lines 61 and 62. The rupture disc is of conventional construction and is designed to rupture when the pressure differential between the annulus and the chamber exceeds a predetermined value dependant upon the mechanical strength of the liner and the allowable extent of compression of the insulation. In order to prevent rupture of the casing in the event the pressure within the annulus or the chamber exceeds the designed operating pressure of the drier, safety valve 65 is connected between lines 61 and 62. Safety valve 65 is also of conventional construction and is designed to be opened by a pressure within either the annulus or within the chamber in excess of the safe operating limit of the drier. Line 61 is provided with screen 70 and line 62 is provided with trap 71 to prevent insulation or desiccant, respectively, from entering the lines and interfering with operation of the rupture disc or the safety valve. Lines 61 and 62 are also provided with valves 72 and 73, respectively, to close the lines in the event adjustments or repairs of the rupture disc or safety valve are required.

In operation, to start the drying cycle, valve 74, in regeneration gas inlet line 13, and valve 75, in regeneration gas outlet line 14, are closed. Valves 80 and 81, in the process gas inlet line 11 and outlet line 12, respectively, are opened. The process gas is passed through the line 11 into the chamber 23 and downwardly through the solid desiccant 31 which adsorbs the moisture from the process gas. The dried process gas then passes out of the drier through line 12. When the desiccant has adsorbed sufficient water vapor to no longer efficiently dry the process gas, the drying cycle is complete and valves 80 and 81 in lines 11 and 12 are closed to shut off the flow of the process gas through the drier.

To regenerate the desiccant, a hot dry gas is passed through the desiccant. Valves 74 and 75 in lines 13 and 14, respectively, are opened, and the regeneration gas enters the drier through line 13, passes upwardly through desiccant 31, and then passes out of the drier through line 14. This regeneration cycle continues until the desiccant is dried to a sufficient extent to permit efficient drying at which time the drier is again ready for the drying cycle.

If the pressure within the annulus decreases so that the pressure differential between the annulus and the chamber falls below the desired value, the pressure controller 44 operates to open motor valve 43 whereby the flow of gas into the annulus is increased and the pressure therein restored to its desired value with respect to the pressure within the chamber. In the event that the pressure within the chamber drops sufficiently to increase the pressure differential between the annulus and the chamber beyond the predetermined value, the controller will operate the valve 43 to reduce or stop the flow of gas into the annulus whereby the pressure within the annulus, by virtue of the continual flow of gas from the annulus through bleed valve 55, will decrease until the desired pressure differential is established. Should the pressure within the annulus or the chamber exceed a value such that danger of damage to the liner 22 will ensue, the rupture disc will burst thereby equalizing the pressures within the annulus and the chamber. Should the pressure within either the annulus or the chamber exceed the safe operating limit of the drier, the safety valve 65 will open to reduce the pressures within the drier.

Having thus described my invention it will be understood that such description has been given by way of illustration and example and not by way of limitation, reference for the latter purpose being had to the appended claims.

I claim:

1. A gas drier comprising in combination an outer casing, a thin metal liner within said casing forming a chamber, said liner being separated from the wall of said casing and forming an annulus between said casing and said liner, a body of solid desiccant within said chamber, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus, a gas inlet line leading to said annulus, a motor valve in said gas inlet line leading to said annulus, a pressure controller connected to and operating said motor valve in response to a predetermined gas pressure differential between said chamber and said annulus, and means connected between said chamber and said annulus for maintaining the pressure differential between said chamber and said annulus within a predetermined limit.

2. A gas drier comprising in combination an outer casing, a thin metal liner within said casing forming a chamber, said liner being separated from the wall of said casing and forming an annulus between said casing and said liner, a body of solid desiccant within said chamber, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus, a gas inlet line leading to said annulus, a motor valve in said gas inlet line leading to said annulus, a pressure controller connected to and operating said motor valve in response to a predetermined gas pressure differential between said chamber and said annulus, a line leading from said annulus to said chamber, and safety valve means in said line from said annulus to said chamber, said safety valve means operating in response to a pressure in excess of the safe operating pressure of said outer casing.

3. A gas drier comprising in combination an outer casing, a thin metal liner within said casing forming a chamber, said liner being separated from the wall of said casing and forming an annulus between said casing and said liner, a body of solid desiccant within said chamber, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus, a gas inlet line leading to said annulus, a motor valve in said gas inlet line leading to said annulus, a pressure controller connected to and operating said motor valve in response to a predetermined gas pressure differential between said chamber and said annulus, a line leading from said annulus to said chamber, a rupture plate and safety valve means in said line from said annulus to said chamber, said rupture plate operating in response to a predetermined pressure differential between said annulus and said chamber and said safety valve means operating in response to a pressure in excess of the safe operating pressure of said outer casing.

4. A gas drier comprising in combination an outer casing, a thin metal liner within said casing forming a chamber, said liner being separated from the wall of said casing and forming an annulus between said casing and said liner, a body of solid desiccant within said chamber, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus, a gas inlet line leading to said annulus, a motor valve in said gas inlet line leading to said annulus, a gas line leading to said motor valve, a pressure controller connected to said gas line leading to said motor valve, a gas line connected between said pressure controller and a point subject to the pressure within said chamber, a gas line connected between said pressure controller and said annulus, a line leading from said annulus, a line leading from said chamber, a line containing a rupture plate connected between said line leading from said annulus and said line leading from said chamber, a line containing a safety valve connected between said line leading from said annulus and said line leading from said chamber, said rupture plate operating in response to a predetermined pressure differential between said annulus and said chamber and said safety valve operating in response to a pressure in excess of the safe operating pressure of said outer casing.

5. A gas drier comprising in combination an outer casing, a manhole in the top of said casing, a manhole in the bottom of said casing, a drain valve in said manhole in the bottom of said casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, a body of solid desiccant within said chamber, a grating to support said desiccant fixed within said casing in the lower portion of said chamber and dividing said annulus into two sections, a line connected between said two sections of said annulus, a process gas inlet line leading to said chamber from without said casing, a valve in said process gas inlet line, a screen in said process gas inlet line between said valve and said chamber, a process gas outlet line leading from said chamber to without said casing, a valve in said process gas outlet line, a screen in said process gas outlet line between said valve and said chamber, a regeneration gas inlet line leading to said chamber from without said casing, a valve in said regeneration gas inlet line, a screen in said regeneration gas inlet line between said valve and said chamber, a regeneration gas outlet line leading from said chamber to without said casing, a valve in said regeneration gas outlet line, a screen in said regeneration gas outlet line between said valve and said chamber, heat insulating material within said annulus between said casing and said liner, a bleed valve leading from said annulus to without said casing, a gas inlet line leading from without said casing to said annulus, a motor valve in said gas inlet line to said annulus, a screen in said gas inlet line between said motor valve and said annulus, a gas line leading from said motor valve to a pressure controller, a gas line from said pressure controller leading into said process gas inlet line at a point between said valve in said process gas inlet line and said chamber, a trap and a valve in said gas line leading into said process gas inlet line from said pressure controller, a gas line from said pressure controller leading into said annulus, a trap and a valve in said gas line leading from said pressure controller into said annulus, a line leading from said annulus to a safety valve, a valve and a trap in said line to said safety valve, a line from said chamber to said safety valve, a valve in said line from said chamber leading to said safety valve, a screen in said line between said chamber and said safety valve, a by-pass line around said safety valve, and a rupture plate in said by-pass line, said safety valve operating in response to a pressure in excess of the safe operating pressure of said outer casing to prevent the rupture of said outer casing, and said rupture plate operating in response to a predetermined safe pressure differential between said annulus and said chamber to prevent collapse of said thin metal liner due to excessive pressure in said annulus or said chamber.

6. A gas drier comprising in combination an outer casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, gas inlet means leading to said chamber from without said casing, gas outlet means leading from said chamber to without said casing, heat insulating material within said annulus between said casing and said liner, means for permitting a constant flow of gas from said annulus to without said casing, means for supplying gas under pressure to said annulus, valve means connected to said last mentioned means, and means connected to said valve means for operating said valve means in response to a predetermined gas pressure differential between said chamber and said annulus.

7. A gas drier comprising in combination an outer casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, a gas inlet line leading to said chamber from without said casing, a gas outlet line leading from said chamber to without said casing, heat insulating material within said annulus between said casing and said liner, a bleed valve leading from said annulus to without said casing, a gas inlet line leading to said annulus, a motor valve in said gas inlet line leading to said annulus, and a pressure controller connected to and operating said motor valve in response to a predetermined gas pressure differential between said chamber and said annulus.

8. A gas drier comprising in combination an outer casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus through the wall of said outer casing, a gas inlet line leading to said annulus, a motor valve in said gas inlet line leading to said annulus, and a pressure controller connected to and operating said motor valve in response to a predetermined gas pressure differential between said chamber and said annulus.

9. A gas drier comprising in combination an outer casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus through the wall of said outer casing, a gas inlet line leading to said annulus, a motor valve in said gas inlet line leading to said annulus, a pressure controller connected to and operating said motor valve in response to a predetermined gas pressure differential between said chamber and said annulus, and means connected between said chamber and said annulus for maintaining the pressure differential between said chamber and said annulus within a predetermined limit.

10. A gas drier comprising in combination an outer casing, a thin metal liner within said casing forming a chamber, said liner being separated from the wall of said casing and forming an annulus between said casing and said liner, a plurality of metal stiffening rings secured to the inside wall of said liner, a plurality of expansion rings formed integral with said liner, a process gas inlet line leading to said chamber from without said casing, a process gas outlet line leading from said chamber to without said casing, a regeneration gas inlet line leading to said chamber from without said casing, a regeneration gas outlet line leading from said chamber to without said casing, heat insulating material within said annulus between said casing and said liner, a bleed valve leading from said annulus through the wall of said outer casing, a gas inlet line leading to said annulus, a motor valve in said gas inlet line leading to said annulus, a pressure controller connected to and operating said motor valve in response to a predetermined gas pressure differential between said chamber and said annulus, a line leading from said annulus to said chamber, and safety valve means in said line from said annulus to said chamber, said safety valve means operating in response to a pressure in excess of the safe operating pressure of said outer casing.

References Cited in the file of this patent

UNITED STATES PATENTS

| Number | Name | Date |
|---|---|---|
| 1,090,814 | Pier | Mar. 24, 1914 |
| 1,661,104 | Barneby | Feb. 28, 1928 |
| 2,083,732 | Moore et al. | June 15, 1937 |
| 2,283,043 | Busch | May 12, 1942 |
| 2,545,384 | Rehrig | Mar. 13, 1951 |
| 2,548,519 | Cummings | Apr. 10, 1951 |